United States Patent
Reeves et al.

(10) Patent No.: US 12,464,379 B2
(45) Date of Patent: Nov. 4, 2025

(54) AUTOMATIC USER EQUIPMENT DEGRADATION OPTIMIZATION

(71) Applicant: T-Mobile USA, Inc., Bellevue, WA (US)

(72) Inventors: Raymond E. Reeves, Orlando, FL (US); Simon Youngs, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 46 days.

(21) Appl. No.: 18/614,448

(22) Filed: Mar. 22, 2024

(65) Prior Publication Data

US 2025/0301336 A1 Sep. 25, 2025

(51) Int. Cl.

| | |
|---|---|
| H04W 72/04 | (2023.01) |
| H04W 4/00 | (2018.01) |
| H04W 8/18 | (2009.01) |
| H04W 24/02 | (2009.01) |
| H04L 29/06 | (2006.01) |
| H04N 21/2343 | (2011.01) |
| H04N 21/845 | (2011.01) |
| H04W 84/14 | (2009.01) |

(52) U.S. Cl.
CPC .............. *H04W 24/02* (2013.01); *H04W 8/18* (2013.01); *H04W 84/14* (2013.01)

(58) Field of Classification Search
CPC ....... H04W 24/02; H04W 8/18; H04W 84/14; H04W 72/04; H04W 4/00; H04L 65/608; H04L 29/06; H04N 21/2343; H04N 21/845

USPC .......................................................... 709/221
See application file for complete search history.

(56) References Cited

U.S. PATENT DOCUMENTS

| | | |
|---|---|---|
| 5,508,941 A | 4/1996 | Leplingard et al. |
| 5,920,607 A | 7/1999 | Berg |
| 6,452,915 B1 | 9/2002 | Jorgensen |
| 6,590,885 B1 | 7/2003 | Jorgensen |
| 6,680,922 B1 | 1/2004 | Jorgensen |
| 7,359,971 B2 | 4/2008 | Jorgensen |

(Continued)

FOREIGN PATENT DOCUMENTS

| | | |
|---|---|---|
| DE | 102013101680 A1 | 3/2014 |
| DE | 102015209070 A1 | 11/2016 |

(Continued)

*Primary Examiner* — Jude Jean Gilles
(74) *Attorney, Agent, or Firm* — Perkins Coie LLP

(57) ABSTRACT

A system of a telecommunications network comprising an automatic user equipment (UE) degradation optimization (AUDiO) Optimizer is disclosed. The AUDiO Optimizer collects network performance metrics or network events associated with a UE and retrieves a user profile that includes information indicating the network activity of the subscriber. The AUDiO Optimizer also obtains information about network events or performance metrics associated with the network. Then it determines a threshold performance degradation of the UE based on this information and, in response to the determination, performs an AUDiO action including automatically causing restart of the UE, applying a service credit to an account of the subscriber, or communicating a service degradation-related communication to the subscriber.

20 Claims, 6 Drawing Sheets

(56) References Cited

U.S. PATENT DOCUMENTS

| | | |
|---|---|---|
| 8,095,075 B2 | 1/2012 | Vadlamudi |
| 8,437,764 B2 | 5/2013 | Doettling et al. |
| 8,463,933 B2 | 6/2013 | Harrang et al. |
| 8,978,056 B2 | 3/2015 | Albal et al. |
| 9,014,688 B2 | 4/2015 | Katepalli et al. |
| 9,247,436 B2 | 1/2016 | Moore et al. |
| 9,655,014 B2 | 5/2017 | Wegmann et al. |
| 9,693,200 B2 | 6/2017 | Dunkin et al. |
| 9,713,036 B2 | 7/2017 | Laselva et al. |
| 9,843,687 B2 | 12/2017 | Campbell et al. |
| 9,893,958 B2 | 2/2018 | Rahman et al. |
| 9,906,254 B2 | 2/2018 | Zhao et al. |
| 9,942,819 B2 | 4/2018 | Sunay et al. |
| 10,075,912 B2 | 9/2018 | Jamadagni et al. |
| 10,171,298 B2 | 1/2019 | Chow et al. |
| 10,405,023 B2 | 9/2019 | Streijl |
| 10,595,214 B2 | 3/2020 | Santhanam et al. |
| 10,708,806 B2 | 7/2020 | Yang et al. |
| 10,869,220 B2 | 12/2020 | Sudarsan et al. |
| 10,993,212 B2 | 4/2021 | Yang et al. |
| 11,284,307 B2 | 3/2022 | Khanka |
| 11,606,716 B2 | 3/2023 | Yoon |
| 11,917,478 B2 | 2/2024 | Bongaarts et al. |
| 2010/0223326 A1 | 9/2010 | Noldus et al. |
| 2011/0007748 A1 | 1/2011 | Yin et al. |
| 2011/0028144 A1 | 2/2011 | Catovic et al. |
| 2011/0136517 A1 | 6/2011 | Seppalainen et al. |
| 2016/0156520 A1 | 6/2016 | Scully et al. |
| 2017/0311294 A1* | 10/2017 | Kim .................. H04L 5/0044 |
| 2018/0160332 A1 | 6/2018 | Harris |
| 2018/0253087 A1* | 9/2018 | Ewens .................. F01D 25/002 |
| 2020/0084254 A1* | 3/2020 | Boggia .................. H04L 65/762 |
| 2020/0382357 A1* | 12/2020 | Hu ...................... H04B 7/0695 |
| 2022/0225080 A1 | 7/2022 | Ng et al. |
| 2023/0138595 A1 | 5/2023 | Song et al. |
| 2023/0209433 A1 | 6/2023 | Tammana et al. |
| 2023/0254703 A1 | 8/2023 | Zhang et al. |

FOREIGN PATENT DOCUMENTS

| | | |
|---|---|---|
| DE | 102017215405 A1 | 3/2019 |
| DE | 112013001411 B4 | 4/2019 |
| EP | 1197040 B1 | 1/2007 |
| EP | 2378429 A2 | 10/2011 |
| EP | 1775899 B1 | 11/2013 |
| EP | 2023502 B1 | 12/2013 |
| EP | 2781123 A1 | 9/2014 |
| EP | 2742715 B1 | 11/2018 |
| EP | 3269164 B1 | 6/2023 |
| JP | H11196113 A | 7/1999 |
| JP | 2005513932 A | 5/2005 |
| JP | 2010500837 A | 1/2010 |
| JP | 4786050 B2 | 10/2011 |
| JP | 2013506314 A | 2/2013 |
| JP | 5945242 B2 | 6/2016 |
| JP | 6516392 B2 | 4/2019 |
| JP | 7044181 B2 | 3/2022 |
| KR | 100610804 B1 | 8/2006 |
| KR | 100825502 B1 | 4/2008 |
| KR | 20130092486 A | 8/2013 |
| KR | 101578473 B1 | 12/2015 |
| WO | 2010121501 A1 | 10/2010 |
| WO | 2013053092 A1 | 4/2013 |
| WO | 2013174222 A1 | 11/2013 |
| WO | 2014116983 A1 | 7/2014 |
| WO | 2015145218 A1 | 10/2015 |
| WO | 2017030713 A1 | 2/2017 |
| WO | 2018028638 A1 | 2/2018 |
| WO | 2018028667 A1 | 2/2018 |
| WO | 2018031065 A1 | 2/2018 |

* cited by examiner

AUTOMATIC USER EQUIPMENT DEGRADATION OPTIMIZATION

BACKGROUND

Fixed wireless is a means of providing internet access to homes using wireless mobile network technology rather than using fixed lines such as cable and fiber. Providers of fixed wireless services typically provide to their customers a customer premises equipment (CPE) that is installed by the customer or the provider's technician on the customer's premises. Other terms for this type of access include wireless local loop (WLL), broadband wireless access (BWA), radio in the loop (RITL), fixed-radio access (FRA), fixed wireless access (FWA), and metro wireless (MW). FWA enables network operators to provide high-speed broadband to suburban and rural areas where the cost of laying fiber or maintaining fiber lines is prohibitively expensive. FWA can be provided using a variety of radio technologies, including 4G LTE and 5G.

BRIEF DESCRIPTION OF THE DRAWINGS

Detailed descriptions of implementations of the present invention will be described and explained through the use of the accompanying drawings.

Figure 1:
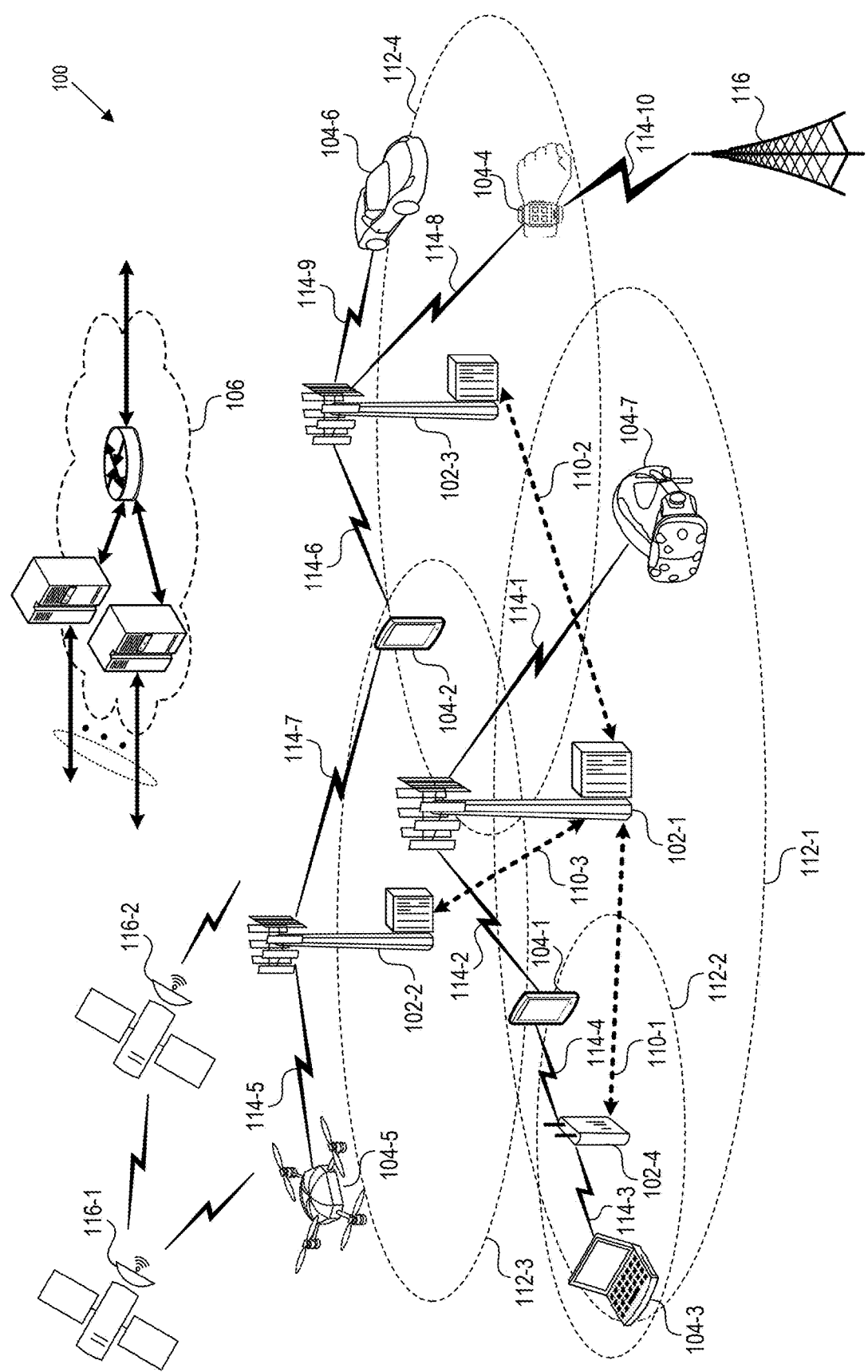
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed technology relates to a system of a telecommunications network for detecting service degradation experienced by a user device and automatically taking steps to recover from the degradation. The user device can be a user equipment (UE) capable of providing home internet (HINT) service using fixed wireless access (FWA) technologies. The disclosed technology can be referred to as Automatic UE Degradation Optimization (AUDiO). In some implementations, the system can include a UE that is configured as a standard customer premises equipment (CPE). In some other implementations, the system can include an AUDiO-capable CPE, which is a UE that is configured to additionally support AUDiO algorithms. The system includes an AUDiO Optimizer function and an AUDiO Agent function. The AUDiO Optimizer function analyzes network measurements and events related to the UE, user profile information associated with a subscriber of the UE, and network configuration and events related to network elements serving the UE. The AUDiO Optimizer function then determines whether service degradation has occurred or is likely to occur and, if yes, what action should be taken in response to the degradation. The action to be taken can be referred to as an AUDiO action. Once the AUDiO Optimizer function has made such a determination, the AUDiO Agent function issues at least one appropriate command to at least one network element of the telecommunications network or the UE, or both, to implement the AUDiO Optimizer function's decision. The AUDiO action to be taken can include restarting the UE, initiating a process to apply an automatic compensatory service credit to an account of the subscriber, initiating a process to proactively send a communication to the subscriber regarding the service degradation, or any combination thereof.

HINT services today are provided using various FWA technologies, including 4G LTE and 5G. Since these services, especially those using LTE and 5G, are relatively new in the marketplace, they often rely on early generation UEs that have limited hardware and software capabilities. These UEs are prone to frequent failures due to issues such as factory defects, memory leaks, etc., resulting in a large volume of calls from subscribers of these services to the service provider's customer care centers. In comparison to ordinary mobile devices, HINT UEs have lower mean time to failure (MTTF) because, unlike ordinary mobile devices that move around from cell site to cell site establishing transient connections with each cell site and tearing them down after short periods, HINT CPEs are usually stationary and may be served by the same cell site for extended periods, thereby increasing the chances of the HINT CPE experiencing a performance degradation without any recourse. After analyzing the reasons for these calls and steps taken to resolve the issues, the inventors have recognized that many of these issues can be resolved by restarting the UE. Accordingly, the technology disclosed here relates to a system for automatically detecting HINT service degradation and taking responsive actions, including issuing a command to the UE to restart itself, to recover from the degradation.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, internet protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The coverage area 112 for a base station 102 can be divided into sectors making up only a portion of the coverage area (not shown). The network 100 can include base stations of different types (e.g., macro and/or small cell base stations). In some implementations, there can be overlapping coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites, such as satellites 116-1 and 116-2, to deliver services anywhere and anytime and provide coverage in areas that are unreachable by any conventional Terrestrial Network (TN). A 6G implementation of the network 100 can support terahertz (THz) communications. This can support wireless applications that demand ultrahigh quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and Core architecture to achieve Control and User Plane Separation (CUPS) and achieve extremely low user plane latency. In yet another example of 6G, the network 100 can implement a converged Wi-Fi and Core architecture to increase and improve indoor coverage.

5G Core Network Functions

Figure 2:
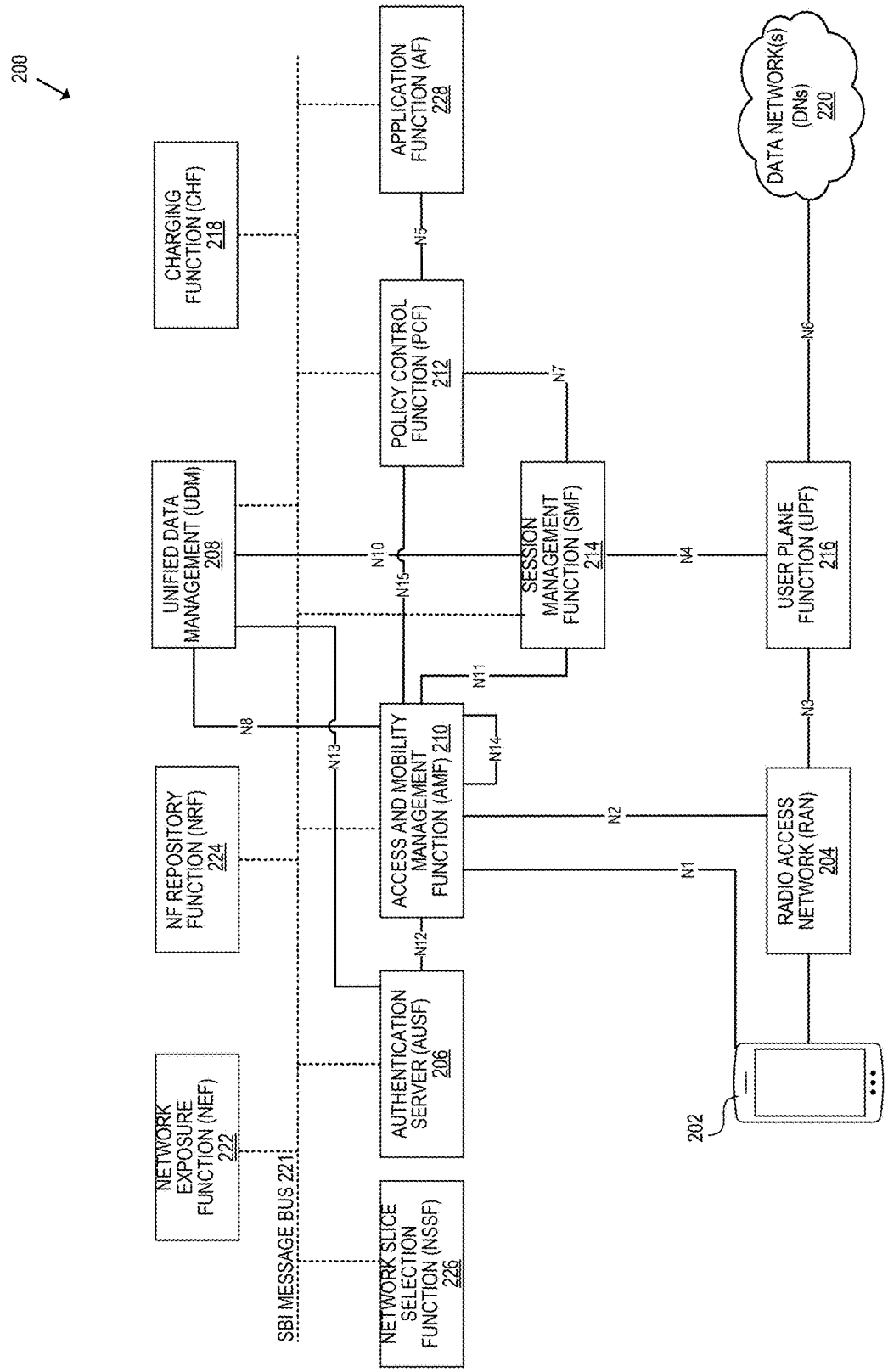
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a RAN 204. The NFs include an Authentication Server Function (AUSF) 206, a Unified Data Management (UDM) 208, an Access and Mobility management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more Application Functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

System to Automatically Detect and Correct UE Degradation

Figure 3:
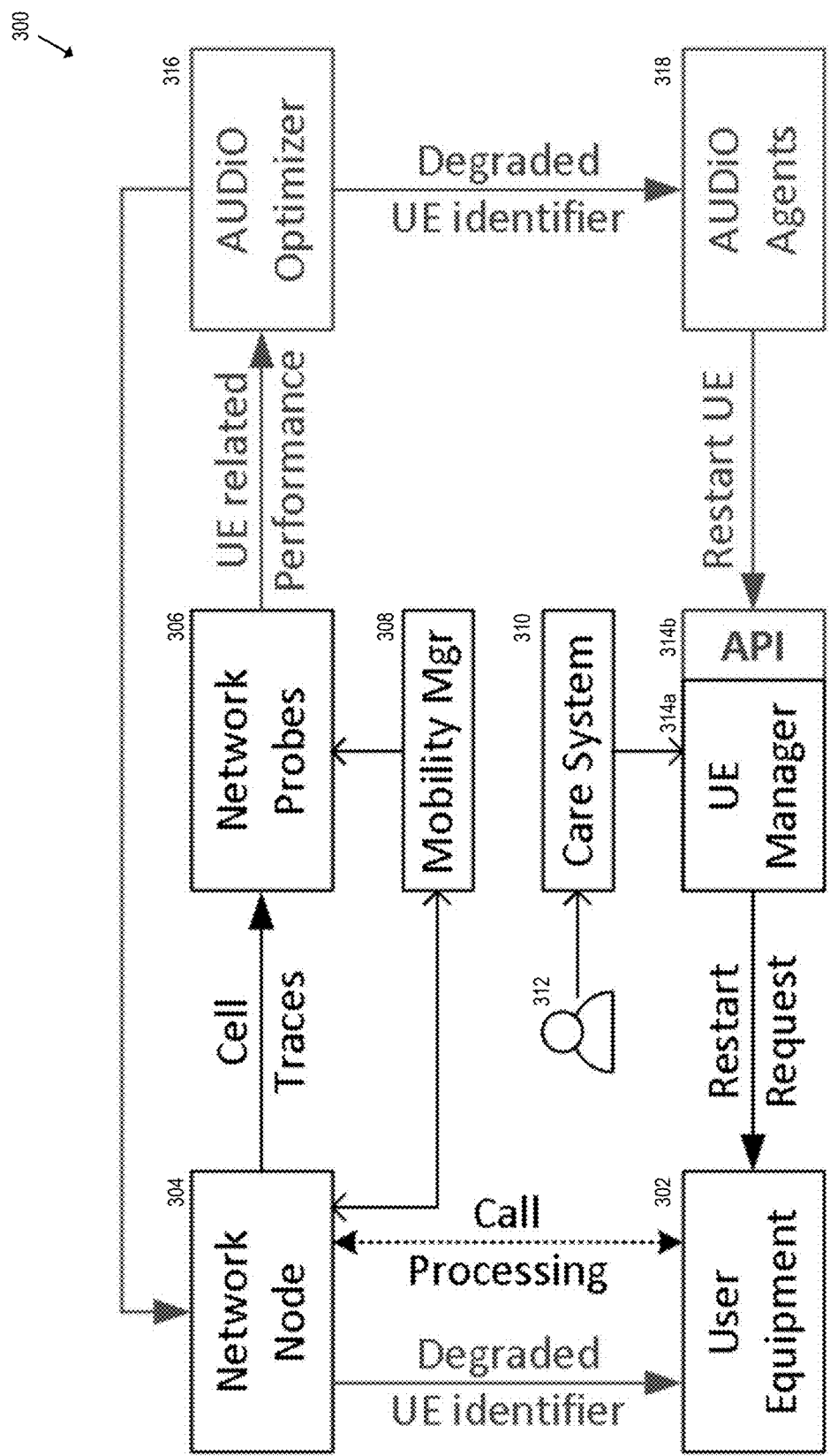
FIG. 3 is a block diagram of a system of a telecommunications network in which at least some aspects of the disclosed technology are implemented.

FIG. 3 is a block diagram of a system 300 of a telecommunications network in which at least some aspects of the disclosed technology are implemented. User Equipment (UE) 302 can be a standard UE or an AUDiO-capable UE that is served by at least one Network Node 304. Network Node 304 can be an eNodeB in an LTE network or a gNodeB in a 5G network. In a normal operating state of the system, call processing and user and control plane data associated with the home internet (HINT) service flow between the UE 302 and the at least one Network Node 304. The term Network Node 304 here is to be construed broadly to refer to one or more network nodes in the telecommunications network. Thus, at any given time, UE 302 can be served by one or more Network Nodes 304.

Network Probes 306 comprise one or more test UEs disposed by an operator of the telecommunications network at various locations within the coverage area of the telecommunications network to periodically monitor and report network performance and health metrics related to the telecommunications network. The term Network Probes 306 is to be broadly construed to also include infrastructure necessary to collect, report, and store those metrics. The Network Probes 306 can monitor network performance and health metrics by collecting cell trace information from one or more Network Nodes 304 that serve the Network Probes 306. At any given time, the Network Probes 306 may be served by the same Network Node 304 as the UE 302 or may be served by a different Network Node 304 in the telecommunications network. Mobility Manager 308 provides mobility management and non-access stratum (NAS) services to the Network Node 304 and Network Probes 306. In some implementations, where the telecommunications network is an LTE network, the Mobility Manager 308 can be a Mobility Management Entity (MME). In some implementations, where the telecommunications network is a 5G network, the Mobility Manager 308 can be an Access and Mobility Management Function (AMF) and a Session Management Function (SMF).

The Care System 310 is a system used by a customer service representative 312 of the telecommunications network to provide customer support and issue redressal services to subscribers of the HINT service. The customer service representative 312, using the Care System 310, can remotely perform various maintenance activities on the subscriber's UE 302. In some implementations, the maintenance activities can be performed by a UE Manager 314a and can include sending commands to the UE 302 to restart itself.

The system 300 includes at least one AUDiO Optimizer function 316 that is configured to analyze network measurement data related to the UE 302, cell trace data related to the Network Node 304, and user profile data related to the subscriber of the UE 302 to determine whether service degradation has or is likely to occur and, if yes, what remedial action needs to be taken. In some implementations, the AUDiO Optimizer function 316 can be implemented as a dedicated physical network element in the telecommunications network. In other implementations, the AUDiO Optimizer function 316 can be implemented as a service running in a cloud computing environment. In yet other implementations, the AUDiO Optimizer function 316 can be implemented as a service running in a multi-access edge computing (MEC) environment. In yet other implementations, the AUDiO Optimizer function 316 can be combined with another network element in the telecommunications network.

In some implementations, the AUDiO Optimizer function 316 can employ machine learning algorithms to learn the subscriber's service usage patterns to determine an optimum time to take a corrective action to recover the UE 302 from service degradation. In some implementations, the AUDiO Optimizer function 316 can employ machine learning algorithms to learn from a success rate of at least one past AUDiO action taken on UE 302, determine a probability for whether a similar responsive action is likely to succeed at a present time and, based on the determination, take or reject a similar responsive action. In some implementations, the system 300 can include more than one instance of AUDiO Optimizer function 316 disposed at more than one location in the telecommunications network, with each instance of AUDiO Optimizer function 316 coordinating its operation with other instances of AUDiO Optimizer function 316 in a federated manner.

In some implementations, the AUDiO Optimizer function 316, upon determining that a responsive AUDiO action needs to be taken to recover UE 302 from service degradation, can send a request to the Network Node 304 serving the UE 302 to restart the UE 302. The Network Node 304 can then relay a command to the UE 302 to restart itself. In some implementations, the AUDiO Optimizer function 316, upon determining that a responsive action needs to be taken to recover UE 302 from service degradation, can notify at least one AUDiO Agent function 318 to take the action. In some implementations, the AUDiO Agent function 318 can be a lean agent with limited computing capabilities. The AUDiO Agent function 318 is coupled with the UE Manager 314a via an Application Programming Interface (API) 314b. The AUDiO Agent function 318 can send a command to the UE Manager 314a via the API 314b to restart UE 302. In some implementations, the AUDiO Agent function 318 can be implemented as a dedicated physical network element in the telecommunications network. In some implementations, the AUDiO Agent function 318 can be implemented as a service running in a cloud computing environment. In yet other implementations, the AUDiO Agent function 318 can be implemented as a service running in an MEC environment. In yet other implementations, the AUDiO Agent function 318 can be combined with another network element in the telecommunications network. In some implementations, the AUDiO Agent function 318 can be combined with the AUDiO Optimizer function 316. In other implementations, the AUDiO Agent function 318 can be combined with the UE Manager 314a.

Figure 4:
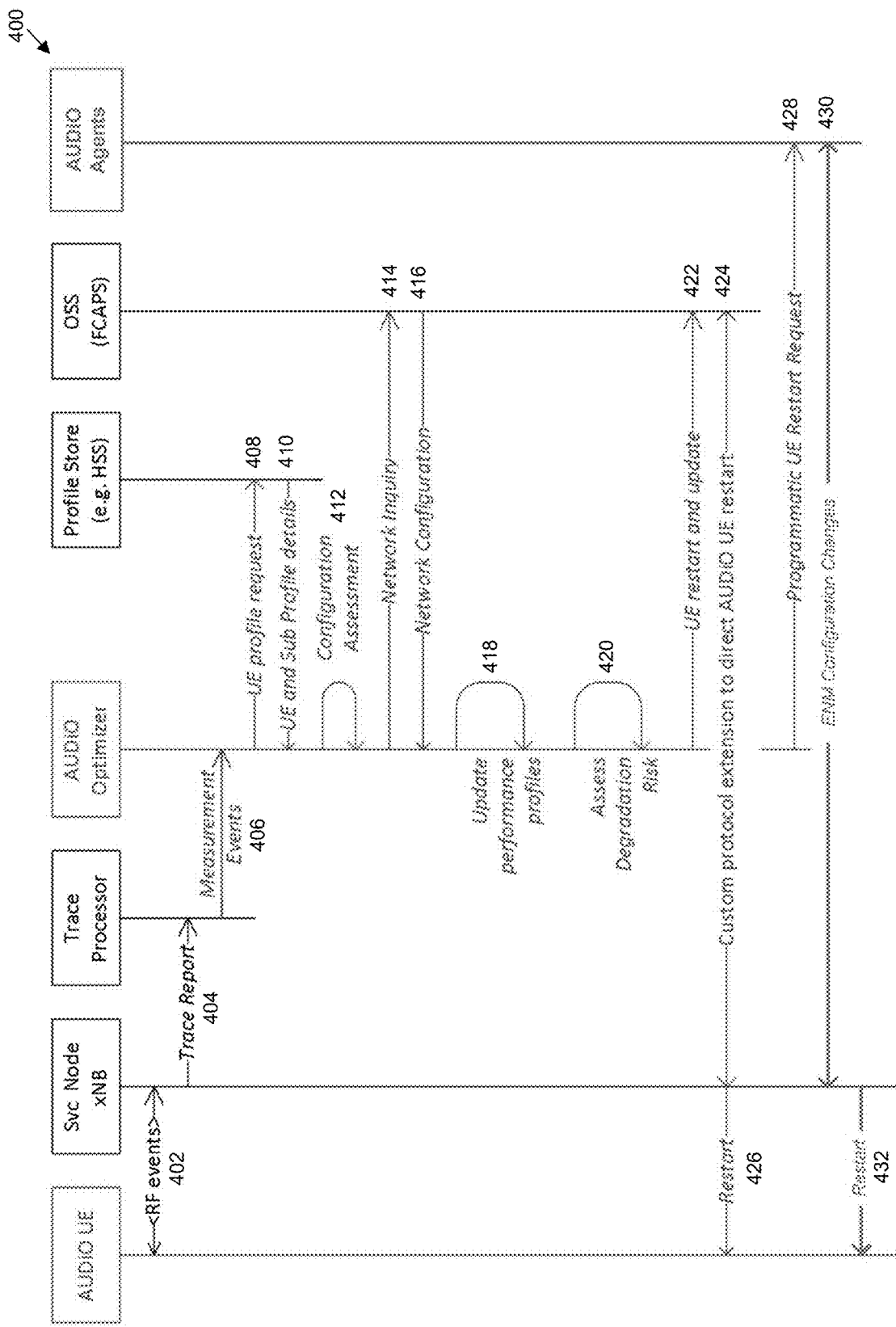
FIG. 4 is a call flow diagram of a process in which at least some aspects of the disclosed technology are implemented.

FIG. 4 is a call flow diagram of a process 400 in which at least some aspects of the disclosed technology are implemented. An AUDiO-capable UE is served by a service node, which can be an eNodeB if the telecommunications network is an LTE network or a gNodeB if the telecommunications network is a 5G network. The telecommunications network includes a trace processor function that comprises one or more network probes disposed at one or more locations within the coverage area of the telecommunications network, along with the necessary infrastructure to receive, store, and analyze network measurement, performance, and health reports received from one or more network probes and Service Nodes in the telecommunications network. The telecommunications network also includes an AUDiO Optimizer function that is responsible for analyzing network measurement data related to the AUDiO UE, cell trace data related to the Service Node, and user profile data related to a subscriber of the AUDiO UE to determine whether service degradation has or is likely to occur and, if yes, what remedial action needs to be taken. The user profile data related to the subscriber of the AUDiO UE is stored in a Profile Store. In some implementations, the profile store can be a Home Subscriber Server (HSS). The telecommunications network also includes at least one Operation Support System (OSS) for managing Service Nodes in the telecommunications network. The OSS supports various network management functions such as fault management, configuration management, accounting management, performance management, and security management, collectively known as FCAPS functions. The AUDiO Optimizer function, upon determining that an action needs to be taken in response to the service degradation, can notify an AUDiO Agent function to take the action. The AUDiO Agent function is configured to send a command to the AUDiO UE to restart itself.

At 402, under normal operation between the Service Node serving the AUDiO UE, various radio frequency (RF) events can occur, including network registration and deregistration by the AUDiO UE, service requests by the AUDiO UE, handover events, location updates sent by AUDiO UE to the telecommunications network, and exchange of traffic between the AUDiO UE and the Service Node. Under abnormal operation between the Service Node and the AUDiO UE, the AUDiO UE can experience loss or weakening of signal, dropped and/or blocked connections, reduction in data throughput, or increased latency and/or jitter. At 404, the Service Node is configured to periodically or aperiodically, or both, send at least one trace report comprising AUDiO UE performance and health metrics or Service Node performance and health metrics, or both, to the Trace Processor. The trace report can comprise information related to received signal strength reported by AUDiO UE, received signal quality reported by AUDiO UE, network latency, network jitter, traffic volume (tonnage), network reliability, network availability, peak data throughput, user data throughput, spectral efficiency, connection density, energy efficiency, mobility, configured spectral bandwidth, list of available Service Nodes as reported by the AUDiO UE, and device model and software version of the AUDiO UE. At 406, the information contained in the trace reports is sent to the AUDiO Optimizer function.

At 408, the AUDiO Optimizer function sends a UE profile request to the Profile Store. The UE profile can include various types of information pertaining to the AUDiO UE and the subscriber of the AUDiO UE, such as pattern of traffic volume variation at various periods in a day or various days in a week, or both, pattern of service usage by the subscriber of the AUDiO UE, whether the subscriber has subscribed to receive a static IP address or a dynamic IP address, billing, policy and charging control information pertaining to the subscriber, and whether previous AUDiO actions were performed on the AUDiO UE.

At 410, the Profile Store sends a response to the AUDiO Optimizer function with the requested information. At 412, the AUDiO Optimizer analyzes the information received from the Trace Processor and the Profile Store to determine whether the network performance experienced by the AUDiO UE is within an expected variance for that AUDiO UE and subscriber profile or whether the AUDiO UE is experiencing or is likely to experience an extraordinary service degradation.

At 414, the AUDiO Optimizer function sends a network inquiry to the OSS. At 416, the AUDiO Optimizer function receives network configuration information from the OSS. The network configuration information can comprise, for example, information pertaining to network performance and health of the Service Node serving the AUDiO UE, information pertaining to the hardware type of the Service Node, and information pertaining to network outages affecting the local area of the Service Node serving the AUDiO UE.

At 418, the AUDiO Optimizer function updates a performance profile of the AUDiO UE based on foregoing analysis to include a probability of the AUDiO UE experiencing a service degradation.

At 420, the AUDiO Optimizer function assesses whether a service degradation experienced by the AUDiO UE is an issue specific to that AUDiO UE, thereby requiring a responsive action, or whether the service degradation is affecting other UEs in the local region as well. Further, the AUDiO Optimizer function also determines what action, if one is required, would be appropriate in response to the service degradation. In some implementations, the responsive action can include restarting the AUDiO UE, reregistering the AUDiO UE with the telecommunications network, implementing at least one configuration change at the AUDiO UE, implementing at least one configuration change at the Service Node, initiating a process to apply an automatic compensatory service credit to an account of the subscriber, initiating a process to proactively send a communication to the subscriber regarding the service degradation, or any combination thereof.

At 422, when the AUDiO Optimizer function has determined that an AUDiO action is required in response to the service degradation, the AUDiO Optimizer function can send a request to the OSS to implement the action. At 424, the OSS sends a command to the Service Node to take the action. In some implementations, the command for the action can be communicated using at least one custom signal, at least one custom message, at least one custom protocol extension, or any combination thereof to standard signals, messages, and protocols implemented in a 3GPP standards-compliant telecommunications network. At 426, when the responsive action needs to be taken at the AUDiO UE, the Service Node forwards the command from the OSS to the AUDiO UE.

Alternatively, at 428, when the AUDiO Optimizer function has determined that an AUDiO action is required in response to the service degradation, the AUDiO Optimizer function can send a request to the AUDiO Agent function to implement the action. At 430, the AUDiO Agent function sends a command to the Service Node to take the AUDiO action. At 432, when the action needs to be taken at the AUDiO UE, the Service Node forwards the command from the AUDiO Agent function to the AUDiO UE. In some implementations, the telecommunications network can include capabilities to implement the action via the OSS, the AUDiO Agent function, or both.

Figure 5:
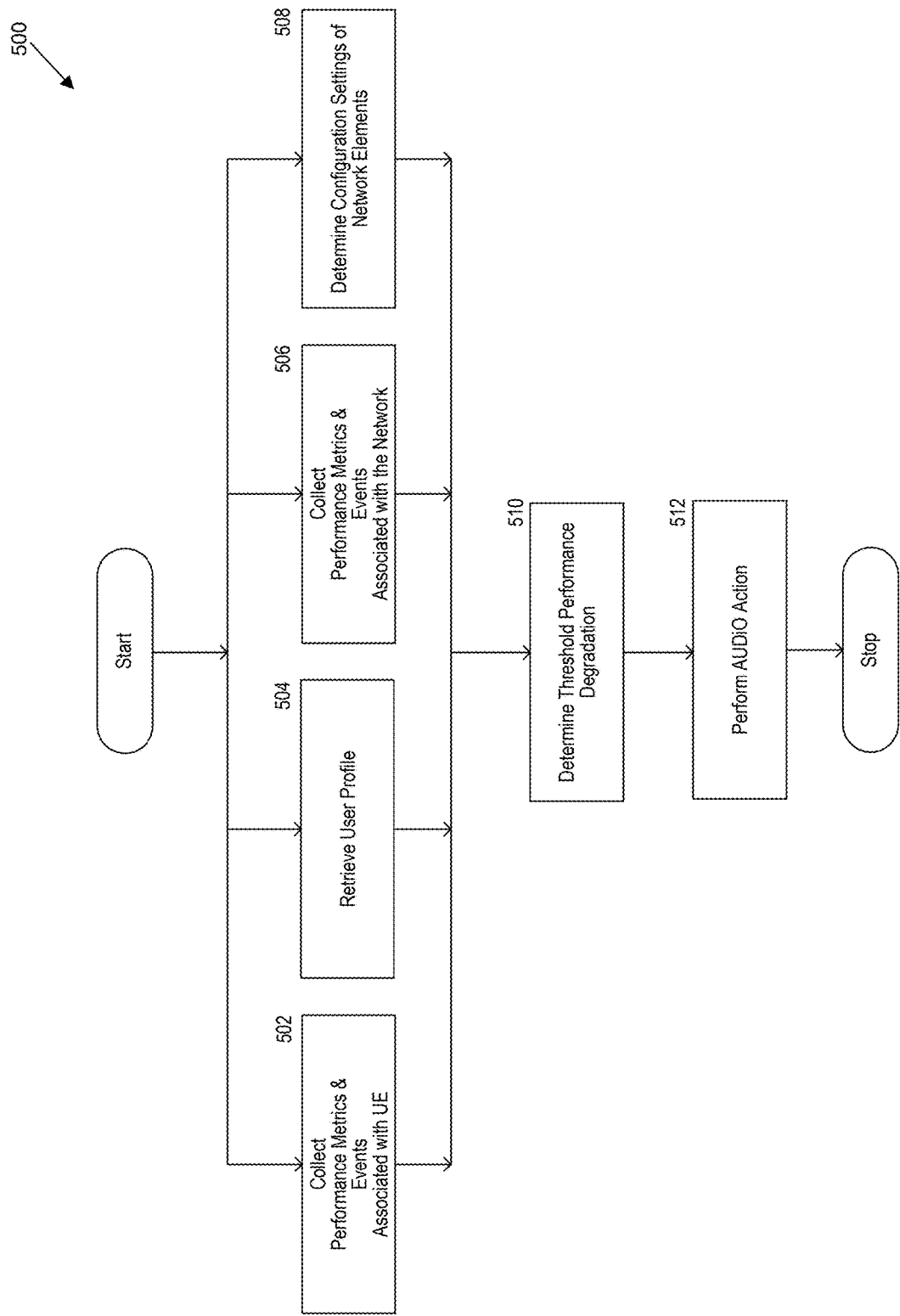
FIG. 5 is a flowchart of a process in which at least some aspects of the disclosed technology are implemented.

FIG. 5 is a flowchart of a process 500 in which at least some aspects of the disclosed technology are implemented. The disclosed technology relates to a system of a telecommunications network comprising an automatic UE degradation optimization (AUDiO) optimizer including at least one hardware processor and at least one non-transitory memory storing instructions. In some implementations, the AUDiO Optimizer is implemented on a stand-alone network element in the telecommunications network. In some implementations, the AUDiO Optimizer is implemented as software in a cloud computing environment.

At 502, the instructions, when executed by the at least one hardware processor, cause the AUDiO Optimizer to collect, from a network probe, at least one of a network performance metric or a network event associated with a UE. In some implementations, the UE can be compatible with 3GPP specifications but not AUDiO specifications. In some implementations, the UE can be compatible with 3GPP specifications and additionally compatible with AUDiO specifications. At 504, the AUDiO Optimizer is caused to retrieve, from a profile store of the telecommunications network, a user profile of a subscriber of the UE. The user profile includes information indicative of network activity of the subscriber on the telecommunications network. The network activity of the subscriber on the telecommunications network includes at least one of a temporal pattern of traffic volume variation, a service feature subscribed to by the subscriber, billing information of the subscriber, a policy and charging control rule associated with the subscriber, or information related to a prior AUDiO action taken at the UE. The prior AUDiO action taken at the UE includes at least one of restarting the UE, initiating a process to apply a compensatory service credit to an account of the subscriber, or initiating a process to send a service degradation-related communication to the subscriber.

At 506, the AUDiO Optimizer is caused to obtain information of at least one of a network event or a performance metric associated with the telecommunications network. The network performance metric associated with the UE includes at least one of received signal strength or quality, data volume or throughput, network latency or jitter, or handover success rate. The network event associated with the UE includes at least one of a loss of signal, a dropped or blocked connection, a threshold decrease in data throughput, a threshold increase in network latency, or a threshold increase in network jitter. The threshold decrease in data throughput can be any number in the range of 5% to 100%, both inclusive. The threshold increase in network latency and network jitter each can be any number in the range of 5% to 100%, both inclusive.

At 508, the AUDiO Optimizer is caused to determine a configuration setting of a network element of the telecommunications network. At 510, the AUDiO Optimizer is caused to determine a threshold performance degradation of the UE based on the network performance metric or the network event associated with a UE meeting their respective threshold, the network activity of the subscriber, the network event or the performance metric associated with the telecommunications network, or the configuration setting of a network element of the telecommunications network. At 512, the AUDiO Optimizer is caused to, in response to the determination of the threshold performance degradation of the UE, perform an AUDiO action including automatically causing restart of the UE, applying a service credit to an account of the subscriber, or communicating a service degradation-related communication to the subscriber. In some implementations, restarting the UE comprises causing the system to send a restart request to an OSS of the telecommunications network. In some implementations, restarting the UE comprises causing the system to send a restart request to an AUDiO Agent. The AUDiO Agent is communicatively coupled with a UE manager of a customer care system of the telecommunications network that is configured to communicate, through the telecommunications network, the restart request to the UE. In some implementations, the AUDiO Agent is implemented on a stand-alone network element in the telecommunications network. In some implementations, the AUDiO Agent is implemented as software in a cloud computing environment. In other implementations, the AUDiO Agent is implemented in an MEC environment. In yet other implementations, the AUDiO Agent is combined with the AUDiO Optimizer.

Computer System

Figure 6:
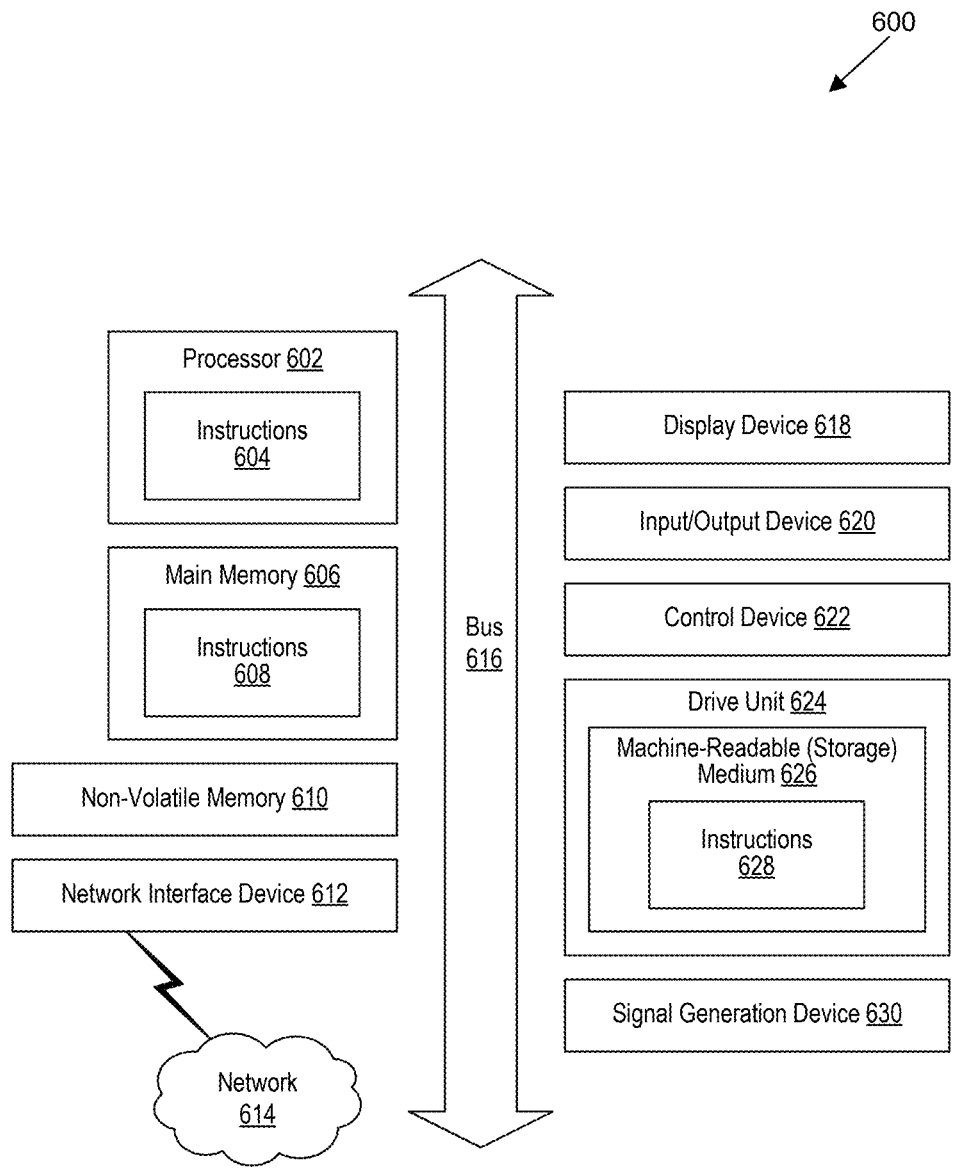
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a machine-readable (storage) medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computing system 600 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computing system 600 to mediate data in a network 614 with an entity that is external to the computing system 600 through any communication protocol supported by the computing system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable medium 626 can include any medium that is capable of storing, encoding, or carrying a set of instructions for execution by the computing system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computing system 600 to perform operations to execute elements involving the various aspects of the disclosure.

REMARKS

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system of a telecommunications network comprising:
   an automatic user equipment (UE) degradation optimization (AUDiO) Optimizer including:
      at least one hardware processor; and
      at least one non-transitory memory storing instructions, which, when executed by the at least one hardware processor, cause the AUDiO Optimizer to:
   collect, from a network probe, at least one of a network performance metric or a network event associated with a UE,
      wherein the UE is compatible with 3GPP specifications or is additionally compatible with AUDiO specifications;
   retrieve, from a profile store of the telecommunications network, a user profile of a subscriber of the UE,
      wherein the user profile includes information indicative of network activity of the subscriber on the telecommunications network;
   obtain information of at least one of a network event or a performance metric associated with the telecommunications network;
   determine a threshold performance degradation of the UE based on the network performance metric or the network event associated with a UE, the network activity of the subscriber, and the network event or the performance metric associated with the telecommunications network; and
   in response to determining the threshold performance degradation of the UE, perform an AUDiO action including to automatically cause restart of the UE, apply a service credit to an account of the subscriber, or communicate a service degradation-related communication to the subscriber.

2. The system of claim 1 further caused to:
   determine a configuration setting of a network element of the telecommunications network,
   wherein determination of the threshold performance degradation is based on the configuration setting.

3. The system of claim 1:
   wherein the network performance metric associated with the UE includes at least one of a received signal strength or quality, data volume or throughput, network latency or jitter, or handover success rate, and
   wherein the network event associated with the UE includes at least one of a loss of signal, a dropped or blocked connection, a threshold decrease in data throughput, a threshold increase in network latency, or a threshold increase in network jitter.

4. The system of claim 1:
   wherein the network activity of the subscriber on the telecommunications network includes at least one of a temporal pattern of traffic volume variation, a service feature subscribed to by the subscriber, billing information of the subscriber, a policy and charging control rule associated with the subscriber, or information related to a prior AUDiO action taken at the UE, and
   wherein the prior AUDiO action taken at the UE includes at least one of restarting the UE, initiating a process to apply a compensatory service credit to an account of the subscriber, or initiating a process to send a service degradation-related communication to the subscriber.

5. The system of claim 1, wherein to restart the UE comprises causing the system to:
   send a restart request to an Operation Support System (OSS) of the telecommunications network.

6. The system of claim 1, wherein to restart the UE comprises causing the system to:
   send a restart request to an AUDiO Agent,
   wherein the AUDiO Agent is communicatively coupled with a UE manager of a customer care system of the telecommunications network that is configured to communicate, through the telecommunications network, the restart request to the UE.

7. The system of claim 1, wherein the UE is a standard UE that is compatible with 3GPP specifications but not AUDiO specifications.

8. The system of claim 1, wherein the UE is compatible with 3GPP specifications and AUDiO specifications.

9. The system of claim 1, wherein the subscriber subscribes to receive a home internet (HINT) service from the telecommunications network.

10. The system of claim 1, wherein the AUDiO Optimizer is implemented on a stand-alone network element in the telecommunications network.

11. The system of claim 1, wherein the AUDiO Optimizer is implemented as software in a cloud computing environment.

12. The system of claim 6, wherein the AUDiO Agent is implemented on a stand-alone network element in the telecommunications network.

13. The system of claim 6, wherein the AUDiO Agent is implemented as software in a cloud computing environment or in a multi-access edge computing environment.

14. The system of claim 6, wherein the AUDiO Agent is combined with the AUDiO Optimizer.

15. A non-transitory, computer-readable storage medium comprising instructions recorded thereon, wherein the instructions, when executed by at least one data processor of a system of a telecommunications network, cause the system to cause an automatic user equipment (UE) degradation optimization (AUDiO) Optimizer to:
   collect, from a network probe, at least one of a network performance metric or a network event associated with a UE,
      wherein the UE is compatible with 3GPP specifications or is additionally compatible with AUDiO specifications;
   retrieve, from a profile store of the telecommunications network, a user profile of a subscriber of the UE,
      wherein the user profile includes information indicative of network activity of the subscriber on the telecommunications network;
   obtain information of at least one of a network event or a performance metric associated with the telecommunications network;
   determine a threshold performance degradation of the UE based on the network performance metric or the network event associated with a UE, the network activity of the subscriber, and the network event or the performance metric associated with the telecommunications network; and in response to the determination of the threshold performance degradation of the UE, perform an AUDiO action including to automatically cause restart of the UE, apply a service credit to an account of the subscriber, or communicate a service degradation-related communication to the subscriber.

16. The non-transitory, computer-readable storage medium of claim 15 wherein the AUDiO Optimizer is further caused to:

determine a configuration setting of a network element of the telecommunications network,
wherein determination of the threshold performance degradation is based on the configuration setting.

17. The non-transitory, computer-readable storage medium of claim 15, wherein the network performance metric associated with the UE includes at least one of a received signal strength or quality, data volume or throughput, network latency or jitter, or handover success rate, and wherein the network event associated with the UE includes at least one of a loss of signal, a dropped or blocked connection, a threshold decrease in data throughput, a threshold increase in network latency, or a threshold increase in network jitter.

18. The non-transitory, computer-readable storage medium of claim 15, wherein the network activity of the subscriber on the telecommunications network includes at least one of a temporal pattern of traffic volume variation, a service feature subscribed to by the subscriber, billing information of the subscriber, a policy and charging control rule associated with the subscriber, or information related to a prior AUDiO action taken at the UE, and wherein the prior AUDiO action taken at the UE includes at least one of restarting the UE, initiating a process to apply a compensatory service credit to an account of the subscriber, or initiating a process to send a service degradation-related communication to the subscriber.

19. The non-transitory, computer-readable storage medium of claim 15, wherein to restart the UE comprises causing the system to send a restart request to an Operation Support System (OSS) of the telecommunications network.

20. The non-transitory, computer-readable storage medium of claim 15, wherein to restart the UE comprises causing the system to:

send a restart request to an AUDiO Agent,
wherein the AUDiO Agent is communicatively coupled with a UE manager of a customer care system of the telecommunications network that is configured to communicate, through the telecommunications network, the restart request to the UE.

* * * * *